(12) United States Patent
Yan et al.

(10) Patent No.: US 8,977,119 B2
(45) Date of Patent: Mar. 10, 2015

(54) AUTOMATIC BIAS CONTROL METHOD AND APPARATUS FOR OPTICAL TRANSMITTER

(71) Applicant: Fujitsu Limited, Kawasaki-shi, Kanagawa (JP)

(72) Inventors: Meng Yan, Beijing (CN); Zhenning Tao, Beijing (CN)

(73) Assignee: Fuijtsu Limited, Kawasaki (JP)

( * ) Notice: Subject to any disclaimer, the term of this patent is extended or adjusted under 35 U.S.C. 154(b) by 9 days.

(21) Appl. No.: 13/934,722

(22) Filed: Jul. 3, 2013

(65) Prior Publication Data
US 2014/0010533 A1  Jan. 9, 2014

(30) Foreign Application Priority Data

Jul. 4, 2012 (CN) .......................... 2012 1 0230521

(51) Int. Cl.
*H04B 10/08* (2006.01)
*H04B 10/564* (2013.01)
*H04B 10/50* (2013.01)

(52) U.S. Cl.
CPC ........ *H04B 10/564* (2013.01); *H04B 10/50575* (2013.01)
USPC ............. 398/38; 398/197; 398/185; 398/186; 398/188

(58) Field of Classification Search
CPC ..................... H04B 10/50575; H04B 10/5053; H04B 10/50572; H04B 10/50593; H04B 10/50595; H04B 10/505; H04B 10/50577; H04B 10/564

USPC ........... 398/183–186, 188, 195, 197, 198, 25, 398/38
See application file for complete search history.

(56) References Cited

U.S. PATENT DOCUMENTS 7,676,162 B2* 3/2010 Isomura et al. ................ 398/212
7,877,025 B2* 1/2011 Tao et al. ....................... 398/209
(Continued)

OTHER PUBLICATIONS

H.G. Choi et al., "Modulation-Format-Free Bias Control Technique for MZ Modulator Based on Differential Phasor Monitor", OSA/OFC/NFOEC 2011, pp. 1-3.
(Continued)

*Primary Examiner* — Daniel Washburn
*Assistant Examiner* — Hibret Woldekidan
(74) *Attorney, Agent, or Firm* — Staas & Halsey LLP

(57) ABSTRACT

The embodiments provide an automatic bias control method and apparatus for an optical transmitter. The apparatus includes: a detecting unit configured to monitor output optical power of an I/Q modulator of the optical transmitter; a calculating unit configured to calculate bias voltage indicating values of the I modulator, Q modulator and phase modulator of the I/Q modulator according to the output optical power and known modulation data; and an adjusting unit configured to adjust respectively Direct-Current (DC) bias voltages of the I modulator, Q modulator and phase modulator according to the bias voltage indicating values of the I modulator, Q modulator and phase modulator. With the embodiments, known modulation data are used to realize automatic bias control by monitoring the evenness of distribution of the power of output optical signals of the transmitter in the four quadrants of an I/Q plane.

8 Claims, 8 Drawing Sheets

(56) References Cited

U.S. PATENT DOCUMENTS

| | | | |
|---|---|---|---|
| 7,953,328 B2* | 5/2011 | Tao et al. | 398/198 |
| 8,762,086 B2* | 6/2014 | Tao et al. | 702/66 |
| 2006/0067414 A1* | 3/2006 | Vadde | 375/260 |
| 2007/0212075 A1 | 9/2007 | Yin | |
| 2007/0262827 A1* | 11/2007 | Walkington | 332/150 |
| 2009/0261918 A1* | 10/2009 | Walkington | 332/103 |
| 2010/0067841 A1* | 3/2010 | Sugiyama et al. | 385/3 |
| 2012/0008963 A1* | 1/2012 | Aruga et al. | 398/183 |
| 2012/0087617 A1* | 4/2012 | Morishita | 385/3 |
| 2012/0301153 A1* | 11/2012 | Takeguchi et al. | 398/135 |
| 2014/0314184 A1* | 10/2014 | Huang et al. | 375/300 |

OTHER PUBLICATIONS

Pak S. Cho et al., "Bias Control for Optical OFDM Transmitters" IEEE Photonics Technology Letters, vol. 22, No. 14, Jul. 15, 2010, pp. 1030-1032.

Liang Dou et al., "Electronic Pre-Distortion Operating at 1 Sample/symbol with Accurate Bias Control for CD Compensation", OSA/OFC/NFOEC 2010, pp. 1-3.

Hiroto Kawakami et al., "Auto Bias Control Technique for Optical 16-QAM Transmitter with Asymmetric Bias Dithering", ECOC Technical Digest 2011 OSA, pp. 1-3.

\* cited by examiner

AUTOMATIC BIAS CONTROL METHOD AND APPARATUS FOR OPTICAL TRANSMITTER

CROSS REFERENCE TO RELATED APPLICATIONS

This application claims the benefit of Chinese Application No. 201210230521.7, filed Jul. 4, 2013, the disclosure of which is incorporated herein by reference.

TECHNICAL FIELD

The present invention relates to optical communication, and in particular to an automatic bias control method and apparatus for optical transmitter.

BACKGROUND ART

In an optical communication system, as the increase of requirements on the system capacity, high-order modulation formats are used to improve the spectrum efficiency. The high-order modulation formats comprise Phase Shift Keying (PSK), Amplitude Shift Keying (ASK), and Quadrature Amplitude Modulation (QAM), etc. Commonly-used QPSK, 16QAM and 8APSK and so on are all examples of high-order modulation formats. In an optical transmitter using a high-order modulation format, an I/Q modulator based on a dual Mach-Zehnder modulator (MZM) is widely used, the structure of which being shown in FIG. 1.

Such an I/Q modulator contains two push-pull MZMs and a phase modulator ($\Phi$). The two MZMs are used to realize modulation of I/Q routes signals, and the phase modulator is used to introduce a fixed 90° phase shift between the I/Q routes. The structure of a single MZM is shown in FIG. 2.

In the MZM shown in FIG. 2, the input optical signals are evenly distributed into two optical waveguides for transmission, and then combined for output. Each of the optical waveguides is applied with electrodes for applying a voltage. The material of the optical waveguides is optoelectronic crystal, and each optical waveguide forms a phase modulator by using an effect of the optoelectronic crystal that its refractive index varies along with an externally applied voltage, with the phase shift generated by the phase modulator to an optical signal being proportional to the applied voltage. A voltage making the phase shift of an optical signal to reach $\pi$ is referred to as a half wave voltage, denoted by $V_\pi$. The voltages applied on the electrodes of the two optical waveguides of a push-pull MZM are always opposite. The direct current component of an externally applied voltage is referred to as a direct current voltage (or bias voltage), denoted by V, and its alternating current component is referred to as an alternating current voltage, denoted by v. Assuming that the complex amplitude of the light input into a single MZM is $E_{in}=1$, the complex amplitude of an output optical signal is:

$$E_{out} = \frac{\alpha}{2}e^{j\frac{\pi}{V_\pi}(V+v)} + \frac{\alpha}{2}e^{-j\frac{\pi}{V_\pi}(V+v)} = \alpha\cos\left(\frac{\pi}{V_\pi}(V+v)\right) \quad (1)$$

where, $0<\alpha\le 1$, $\alpha$ is a positive real number and features loss of each optical waveguide. It is assumed in the above formula that the loss of the two optical waveguides is equal. When direct current bias voltage $$V = -\frac{V_\pi}{2},$$

the above formula may be simplified as:

$$E_{out} = \alpha\sin\left(\frac{\pi}{V_\pi}v\right) \quad (2)$$

At this moment, $E_{out}$ and the alternating voltage v are in a sinusoidal function relation, which is shown in FIG. 3.

$$V = -\frac{V_\pi}{2}$$

is the optimal bias point, i.e. light dimming portion of the MZM. Under such a direct current bias voltage, the complex amplitude of the output optical signal varies in phase with the alternating current voltage. FIG. 3 schematically shows waveforms of an alternating current voltage and an output optical signal. Amplitude modulation may be realized by using a single push-pull MZM according to such a characteristic.

As shown in FIG. 1, in an I/Q modulator, in addition that two MZMs are used to respectively realize the modulation of the I route and the Q route, there exists a relative phase shift between the I/Q routes, which may be realized by using a phase modulator, as shown in FIG. 1 in detail. The voltage applied to this phase modulator is a direct current voltage, denoted by $V_\Phi$. The complex amplitude of the output optical signal of the I/Q modulator may be expressed as:

$$E_{out} = \alpha\cos\left(\frac{\pi}{V_\pi}(V_I + v_i)\right) + e^{j\frac{\pi}{V_\pi}V_\phi}\alpha\cos\left(\frac{\pi}{V_\pi}(V_Q + v_q)\right) \quad (3)$$

For the sake of simplicity, it is assumed that the half wave voltages of each of the phase modulators are equal, denoted by $V_\pi$. However, the conclusion obtained below is not dependent upon such an assumption, that is, such half wave voltages may not be equal, and may be differentiated by different letters in formula (3). $V_I$ in formula (3) denotes the direct current bias voltage on the I-route MZM, and $v_i$ denotes the alternating current voltage on the I-route MZM. $V_Q$ denotes the direct current bias voltage on the Q-route MZM, and $v_q$ denotes the alternating current voltage on the Q-route MZM. And $V_\Phi$ denotes a direct current bias voltage controlling the relative phase shift between the I/Q routes.

In the optimal bias state:

$$V_I = -\frac{V_\pi}{2}, V_Q = -\frac{V_\pi}{2}, V_\phi = \frac{V_\pi}{2} \quad (4)$$

At this moment, formula (3) may be simplified as:

$$E_{out} = \alpha\sin\left(\frac{\pi}{V_\pi}v_i\right) + j\alpha\sin\left(\frac{\pi}{V_\pi}v_q\right) \quad (5)$$

It can be seen from the above formulae that the I/Q modulation may be realized by applying different alternating current voltage on the I-route and Q-route. When the direct current bias voltage on each of the modulators is equal to the value in formula (4), it is the optimal bias state of the I/Q modulator.

In a practical I/Q modulator, the refractive index of an optical wave guide will vary with ambient conditions (such as temperature), which causes the phase shift generated by each optical wave guide to an optical signal to vary with it. Therefore, an I/Q modulator originally located at the optimal bias point is possibly not located at the optimal bias point when the ambient conditions vary, resulting in degradation of the output signals and reduction of system performance. In order that an I/Q modulator is always located at the optimal bias point, the direct current bias voltages $V_I$ and $V_Q$ on the MZM and the direct current bias voltage $V_\Phi$ generating the relative phase shift between the I/Q routes (i.e. the direct current bias voltage on the phase modulator) must be adjusted to compensate for the effect brought by the variation of the ambient conditions. To achieve such an object, automatic bias control (ABC) is needed. ABC, as the name suggests, is to automatically adjust bias voltages, so that the whole I/Q modulator always operates at the optimal bias point.

Currently, there exist some ABC methods, which may be classified into three types: 1) methods using pilot signals, such as documents 1 and 2; 2) methods in which no signal is demodulated and control is fed back according to statistical characteristic (such as power) of a signal, such as documents 3 and 4; and 3) methods in which control is fed back according to a demodulated signal, such as document 5.

Document 1: Y. Yin, "Dual-parallel-MZ modulator bias control", US patent 20070212075.

Document 2: H. Kawakami et al, "Auto bias control technique for optical 16-QAM transmitter with asymmetric bias dithering", We.10.P1.47, ECOC 2011.

Document 3: L. Dou et al, "electronic pre-distortion operating at 1 sample/symbol with accurate bias control for CD compensation", OThT4, OFC 2010.

Document 4: Pak S. Cho et al, "Bias control for optical OFDM transmitter", IEEE photonics technology letters, vol. 22, no. 14, Jul. 15, 2010.

Document 5: H. G. Choi et al, "modulation-format-free bias control technique for MZ modulator based on differential phasor monitor", JWA33, OFC 2011.

It should be noted that the above introduction to the background art is only for clear and complete explanation of the technical solution of the present invention, and for the understanding by those skilled in the art. It should not be construed that the above technical solution is known to those skilled in the art as it is described in the background art.

SUMMARY OF THE INVENTION

The embodiments of the present invention provides an automatic bias control method and apparatus for optical transmitter. Wherein known modulation data are used to realize automatic bias control by monitoring the evenness of distribution of the power of output optical signals of the transmitter in the four quadrants of an I/Q plane.

According to one aspect of the embodiments of the present invention, there is provided an automatic bias control apparatus for optical transmitter, wherein the apparatus comprises:

a detecting unit configured to monitor output optical power of an I/Q modulator of the optical transmitter;

a calculating unit configured to calculate respective bias voltage indicating values of the I modulator, Q modulator and phase modulator of the I/Q modulator according to the output optical power and known modulation data; and an adjusting unit configured to adjust respectively Direct-Current (DC) bias voltages of the I modulator, Q modulator and phase modulator according to the respective bias voltage indicating values of the I modulator, Q modulator and phase modulator.

According to another aspect of the embodiments of the present invention, there is provided an optical transmitter, wherein the optical transmitter comprises an I/Q modulator and the automatic bias control apparatus as described above.

According to still another aspect of the embodiments of the present invention, there is provided an automatic bias control method for optical transmitter, wherein the method comprises:

monitoring output optical power of the I/Q modulator of the optical transmitter;

calculating respectively bias voltage indicating values of I modulator, Q modulator and phase modulator of the I/Q modulator according to the output optical power and known modulation data; and adjusting respectively DC bias voltages of the I modulator, Q modulator and phase modulator according to the respective bias voltage indicating values of the I modulator, Q modulator and phase modulator.

The advantages of the embodiments of the present invention exist in: 1) compared with the methods using pilot signals, processes of generating and detecting pilot signals are omitted; 2) compared with the methods feeding back control according to demodulated signals, the complex process of signal demodulation is omitted; and 3) compared with other methods monitoring statistical amounts of signals, the adjustment of the three bias voltages in the I/Q modulator in the method of the embodiments of the present invention is in a right direction toward their optimal values, and no jitter is needed.

In the following description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or In the drawings.

DETAILED DESCRIPTION OF THE INVENTION

The foregoing and other features of the embodiments of the present invention will become apparent through the description below with reference to the accompanying drawings. These embodiments are illustrative only, and are not intended to limit the present invention.

Embodiment 1

Figure 1:
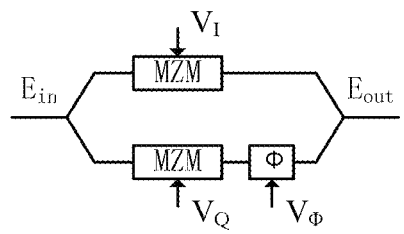
FIG. 1 is a schematic diagram of the composition of an existing I/Q modulator.
Figure 2:
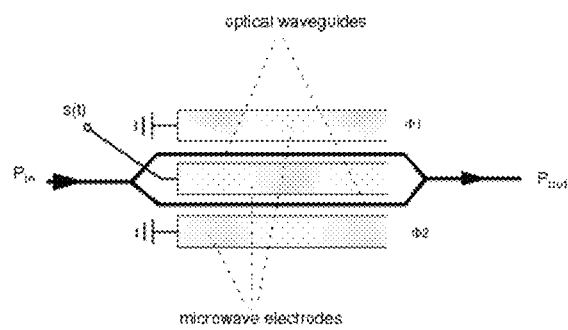
FIG. 2 is a schematic diagram of the structure of an MZM in the I/Q modulator shown in FIG. 1.
Figure 3:
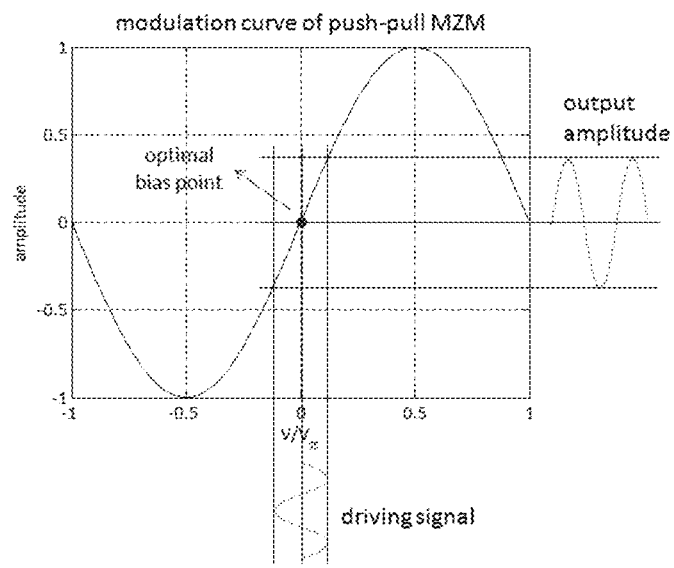
FIG. 3 is a schematic diagram of a modulation curve of a push-pull MZM.
Figure 4:
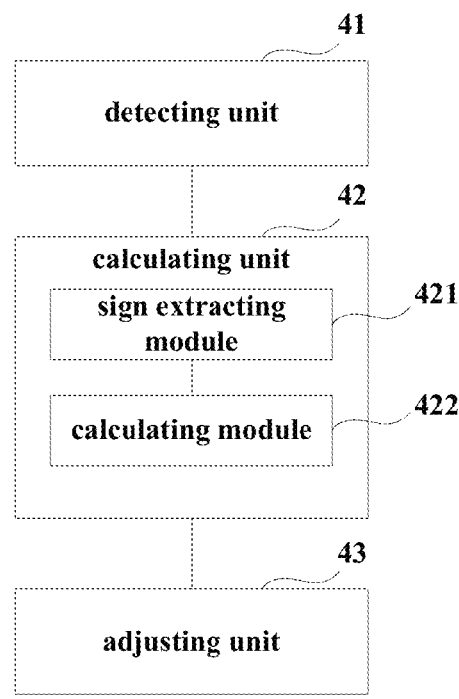
FIG. 4 is a schematic diagram of the composition of the automatic bias control apparatus of the embodiments of the present invention.

An embodiment of the present invention provides an automatic bias control apparatus for optical transmitter. FIG. 4 is a schematic diagram of the composition of the automatic bias control apparatus. Referring to FIG. 4, the apparatus comprises:

a detecting unit 41 configured to monitor output optical power of an I/Q modulator of the optical transmitter;

a calculating unit 42 configured to calculate respective bias voltage indicating values of I modulator, Q modulator and phase modulator of the I/Q modulator according to the output optical power and known modulation data; and an adjusting unit 43 configured to adjust respectively direct current bias voltages of the I modulator, Q modulator and phase modulator according to the respective bias voltage indicating values of the I modulator, Q modulator and phase modulator.

In one embodiment, the calculating unit 42 comprises:

a sign extracting module 421 configured to extract the sign corresponding to I modulation data of the I/Q modulator, the sign corresponding to Q modulation data of the I/Q modulator, and the sign corresponding to a product of the I modulation data and the Q modulation data; and a calculating module 422 configured to calculate respectively the bias voltage indicating values of the I modulator, Q modulator and phase modulator according to the output optical power, the sign corresponding to the I modulation data, the sign corresponding to the Q modulation data and the sign corresponding to the product of the I modulation data and the Q modulation data.

Wherein, the calculating module 422 calculates the bias voltage indicating value of the I modulator according to the output optical power detected by the detecting unit 41 and the sign to which the I modulation data corresponds, calculates the bias voltage indicating value of the Q modulator according to the output optical power detected by the detecting unit 41 and the sign to which the Q modulation data corresponds, and calculates the bias voltage indicating value of the phase modulator according to the output optical power detected by the detecting unit 41 and the sign to which product of the I modulation data and the Q modulation data corresponds.

Particularly, the calculating module 422 calculates respectively the bias voltage indicating values of the I modulator, Q modulator and phase modulator according to the formulae below:

$$\Delta_I = \text{mean}(P \cdot \text{sign}(D_I));$$

$$\Delta_Q = \text{mean}(P \cdot \text{sign}(D_Q));$$

$$\Delta_\Phi = -\text{mean}(P \cdot \text{sign}(D_I * D_Q));$$

where, sign(•) denotes sign extracting operation, that is $$\text{sign}(x) = \begin{cases} 1 & \text{if } x > 0 \\ 0 & \text{if } x = 0 \\ -1 & \text{if } x < 0, \end{cases}$$

and mean(•) denotes averaging operation in a period of time, the length of the period of time being not defined in the present invention.

Therefore, the adjusting unit 43 may adjust respectively the DC bias voltage of the I modulator, the DC bias voltage of the Q modulator and the DC bias voltage of the phase modulator by using the bias voltage indicating values according to the formulae below:

$$V_I = V_I - \mu_I \Delta_I;$$

$$V_Q = V_Q - \mu_Q \Delta_Q;$$

$$V_\Phi = V_\Phi - \mu_\Phi \Delta_\Phi;$$

where, P is the output optical power detected by the detecting unit 41, $D_I$ is the I modulation data of the I/Q modulator, $D_Q$ is the Q modulation data of the I/Q modulator, $D_I * D_Q$ is the product of the I modulation data and the Q modulation data, sign(•) denotes sign extracting operation, sign($D_I$) is the sign corresponding to the I modulation data, sign($D_Q$) is the sign corresponding to the Q modulation data, sign($D_I*D_Q$) is the sign corresponding to the product of the I modulation data and the Q modulation data, mean(•) denotes averaging operation, $\Delta_I$ is the bias voltage indicating value of the I modulator, $\Delta_Q$ is the bias voltage indicating value of the Q modulator, $\Delta_\Phi$ is the bias voltage indicating value of the phase modulator, and $\mu_I$, $\mu_Q$, $\mu_\Phi$ are respective step sizes for adjusting $V_I$, $V_Q$, $V_\Phi$, which are positive real numbers.

For easy understanding of the automatic bias control apparatus of this embodiment, the apparatus of this embodiment shall be described below with reference to a 16QAM constellation.

Assuming that the three bias voltages on the I/Q modulator are near optimal values, that is:

$$V_I = -\frac{V_\pi}{2} + x, \; V_Q = -\frac{V_\pi}{2} + y, \; V_\phi = \frac{V_\pi}{2} + z \quad (6)$$

where, x, y and z are differences between the current bias voltages and the optimal bias voltages.

At this moment, the complex amplitude of the output optical signal is:

$$E_{out} = \alpha\sin\left(\frac{\pi}{V_\pi}(v_i + x)\right) + je^{j\frac{\pi}{V_\pi}z}\alpha\sin\left(\frac{\pi}{V_\pi}(v_q + y)\right) \quad (7)$$

Taking a 16QAM signal as an example, when each of the bias voltages is not an optimal value, the constellation of the signal will be distorted.

Figure 5:
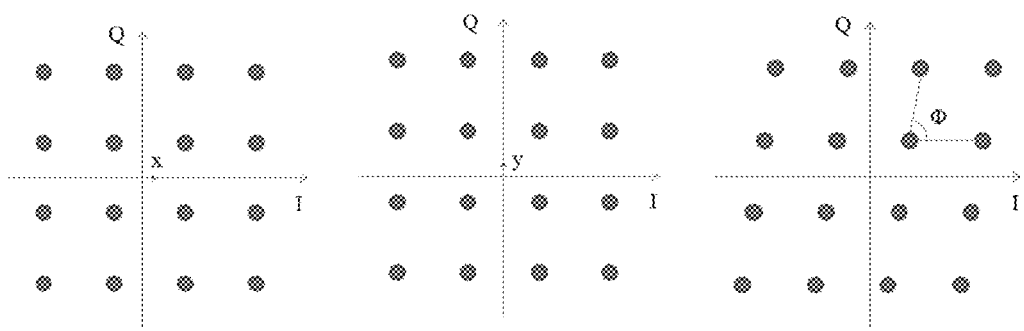
FIG. 5 is a schematic diagram of a signal constellation (taking 16QAM as an example)

FIG. 5(a) shows a case where $V_I$ is not biased at the optimal point (x>0), when the constellation point is translated in the positive direction of the I axis, which will results in that the average power of constellation points of $D_I>0$ is greater than that of constellation points of $D_I<0$; if x<0, it will result in a converse case, that is, the average power of constellation points of $D_I>0$ is less than that of constellation points of $D_I<0$. As the modulation data $D_I$ and $D_Q$ in the transmitter are known, the difference between the average power of constellation points of $D_I>0$ and that of constellation points of $D_I<0$ may be obtained by measurement of optical power, which indicating the direction and size of the current $V_I$ off the optimal bias voltage, according to which the current $V_I$ may be adjusted.

FIG. 5(b) shows a case where $V_Q$ is not biased at the optimal point (y>0), when the average power of constellation points of $D_Q>0$ is greater than that of constellation points of $D_Q<0$; likewise, the difference between the average power of constellation points of $D_Q>0$ and that of constellation points of $D_Q<0$ may be obtained by measurement of optical power, which indicating the direction and size of the $V_Q$ off the optimal bias voltage, according to which the current $V_Q$ may be adjusted.

FIG. 5(c) shows a case where $V_\Phi$ is not biased at the optimal point (z<0), which will result in the variation of the angles of the constellation points ($\Phi<90°$ in the figure) and the average power of constellation points of $(D_I*D_Q)>0$ is greater than that of constellation points of $(D_I*D_Q)<0$. And the difference between the average power of constellation points of $(D_I*D_Q)<0$ and that of constellation points of $(D_I*D_Q)>0$ may be obtained by measurement of optical power, which indicating the direction and size of the $V_\Phi$ off the optimal bias voltage.

As described above, the automatic bias control apparatus provided by this embodiment monitors the output optical power P of the I/Q modulator by using the detecting unit 41, and calculates the following three bias voltage indicating values by using the calculating unit 42:

$$\Delta_I = \text{mean}(P \cdot \text{sign}(D_I)) \quad (8)$$

$$\Delta_Q = \text{mean}(P \cdot \text{sign}(D_Q)) \quad (9)$$

$$\Delta_\Phi = -\text{mean}(P \cdot \text{sign}(D_I*D_Q)) \quad (10)$$

where, mean(•) denotes averaging operation; the values of both $D_I$ and $D_Q$ are known at the transmitter end, and P is the output optical power of the I/Q modulator, which may be measured by an optoelectric detector; in formula (8), $\Delta_I$ denotes the difference between the average power of constellation points of $D_I>0$ and that of constellation points of $D_I<0$, which indicates adjustment direction of $V_I$; in formula (9), $\Delta_Q$ denotes the difference between the average power of constellation points of $D_Q>0$ and that of constellation points of $D_Q<0$, which indicates adjustment direction of $V_Q$; and in formula (10), $\Delta_\Phi$ denotes the difference between the average power of constellation points of $(D_I*D_Q)<0$ and that of constellation points of $(D_I*D_Q)>0$, which indicates adjustment direction of $V_\Phi$.

According to the indication signals in formulae (8)-(10), the adjusting unit 43 may adjust the three bias voltages on the I/Q modulator by using known feedback method. For example, the following formulae may be used to gradually adjust the three bias voltages:

$$V_I = V_I - \mu_I \Delta_I \quad (11)$$

$$V_Q = V_Q - \mu_Q \Delta_Q \quad (12)$$

$$V_\Phi = V_\Phi - \mu_\Phi \Delta_\Phi \quad (13)$$

where, $\mu_I$, $\mu_Q$ and $\mu_\Phi$ correspond respectively to step sizes for adjusting the three bias voltages, which are positive real numbers. The frequencies for adjusting the bias voltages may be determined as actually required. For example, adjustment may be performed for each sign, and may also be performed every other several signs. This embodiment is not limited thereto.

Wherein the formulae (11)-(13) are illustrative only, and the adjusting unit 43 may adjust the three bias voltages on the I/Q modulator by using other known feedback methods. This embodiment is not limited thereto.

Figure 6:
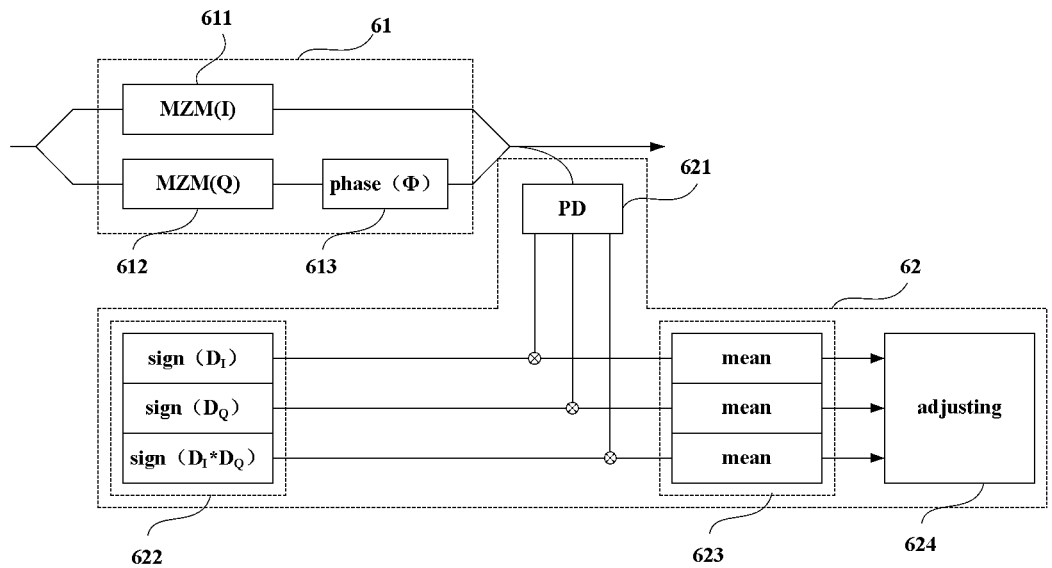
FIG. 6 is a schematic diagram of the structure of the automatic bias control apparatus of the embodiments of the present invention.

FIG. 6 is a schematic diagram of the structure of the automatic bias control apparatus of the embodiments of the present invention. As shown in FIG. 6, the automatic bias control apparatus 62 is configured to adjust direct current bias voltages of the I modulator 611, Q modulator 612 and phase modulator 613. The automatic bias control apparatus 62 comprises an optoelectric detector 621 configured to realize the function of the above-described detecting unit 41. The automatic bias control apparatus 62 further comprises a sign extracting module 622 and a calculating (averaging) module 623 which are configured to realize the function of the above-described calculating unit 42. The automatic bias control apparatus 62 further comprises an adjusting unit 624 configured to realize the function of the above-described adjusting unit 43. The compositions and functions of the detecting unit 41, the calculating unit 42 and the adjusting unit 43 have been described above, and shall not be describe herein any further.

Figure 7:
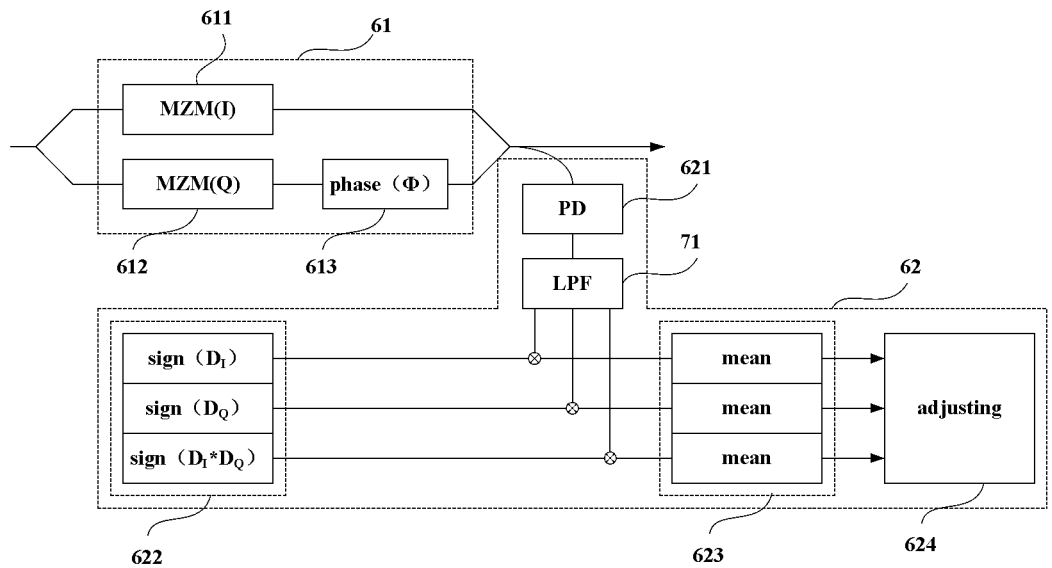
FIG. 7 is a schematic diagram of the structure of a variant of the automatic bias control apparatus of the embodiment shown in FIG. 6.

FIG. 7 is a schematic diagram of the structure of a variant of the automatic bias control apparatus of an embodiment of the present invention. As shown in FIG. 7, besides the composition and function shown in FIG. 6, the automatic bias control apparatus further comprises a low-pass filter (a first low-pass filter module) 71 configured to perform low-pass filtering to the output optical power detected by the optoelectric detector 621. In this embodiment, the detecting unit 61 may be realized by an optoelectric detector, and the output optical power of the I/Q modulator may be measured by the optoelectric detector, and is applied to formulae (8)-(10). In a variant of the automatic bias control apparatus of this embodiment, the automatic bias control apparatus further comprises a low-pass filter configured to perform low-pass filtering to the output optical power detected by the optoelectric detector, so as to filter out-of-band noises. In this embodiment, P in formulae (8)-(10) is a low-pass filtered optical power signal. With the automatic bias control apparatus of this embodiment, the calculating module 623 calculates respectively the bias voltage indicating values of the I modulator, Q modulator and phase modulator according to the low-pass filtered output optical power, the sign corresponding to the I modulation data, the sign corresponding to the Q modulation data and the sign corresponding to the product of the I modulation data and the Q modulation data. That is, three indicating signals are obtained by multiplying the signs corresponding to the three routes by the low-pass filtered output signals of the optoelectric detector and then being averaged, which are used respectively to adjust the bias voltages of the I, Q and Φ routes.

Figure 8:
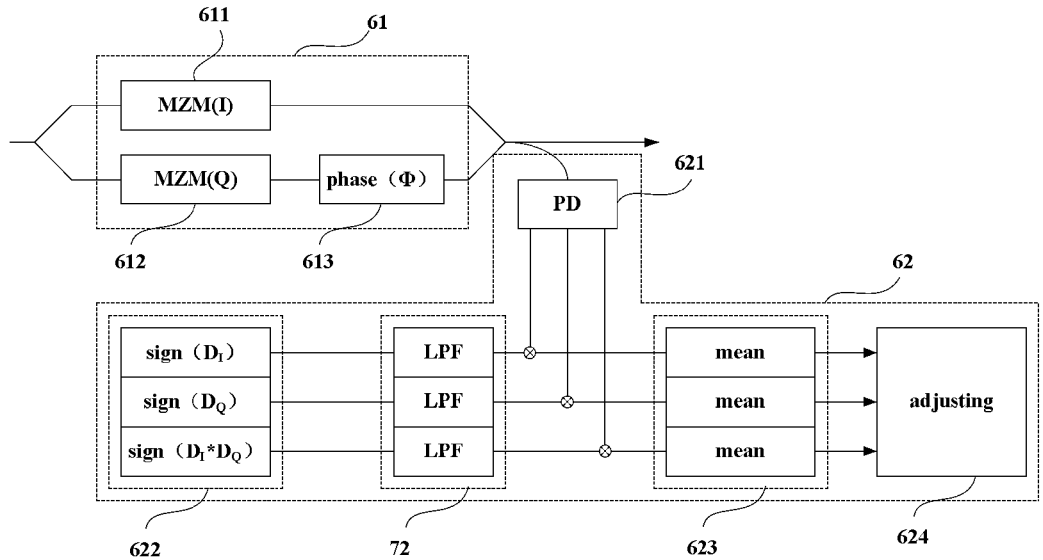
FIG. 8 is a schematic diagram of the structure of another variant of the automatic bias control apparatus of the embodiment shown in FIG. 6.

FIG. 8 is a schematic diagram of the structure of another variant of the automatic bias control apparatus of an embodiment of the present invention. As shown in FIG. 8, besides the composition and function shown in FIG. 6, the automatic bias control apparatus further comprises a low-pass filter (a second low-pass filter module) 72 configured to perform low-pass filtering to the sign corresponding to the I modulation data, the sign corresponding to the Q modulation data and the sign corresponding to the product of the I modulation data and the Q modulation data. In the embodiment shown in FIG. 8, the three signals $\text{sign}(D_I)$, $\text{sign}(D_Q)$ and $\text{sign}(D_I*D_Q)$ are first low-pass filtered by a low-pass filter and then enter into a multiplier. With the automatic bias control apparatus of this embodiment, the calculating module 623 calculates respectively the bias voltage indicating values of the I modulator, Q modulator and phase modulator according to the output optical power, the low-pass filtered sign corresponding to the I modulation data, the low-pass filtered sign corresponding to the Q modulation data and the low-pass filtered sign corresponding to the product of the I modulation data and the Q modulation data. That is, three indicating signals are obtained by multiplying the low-pass filtered signs corresponding to the three modulation data by the output signals of the optoelectric detector and then being averaged s, which are used respectively to adjust the bias voltages of the I, Q and Φ routes.

Figure 9:
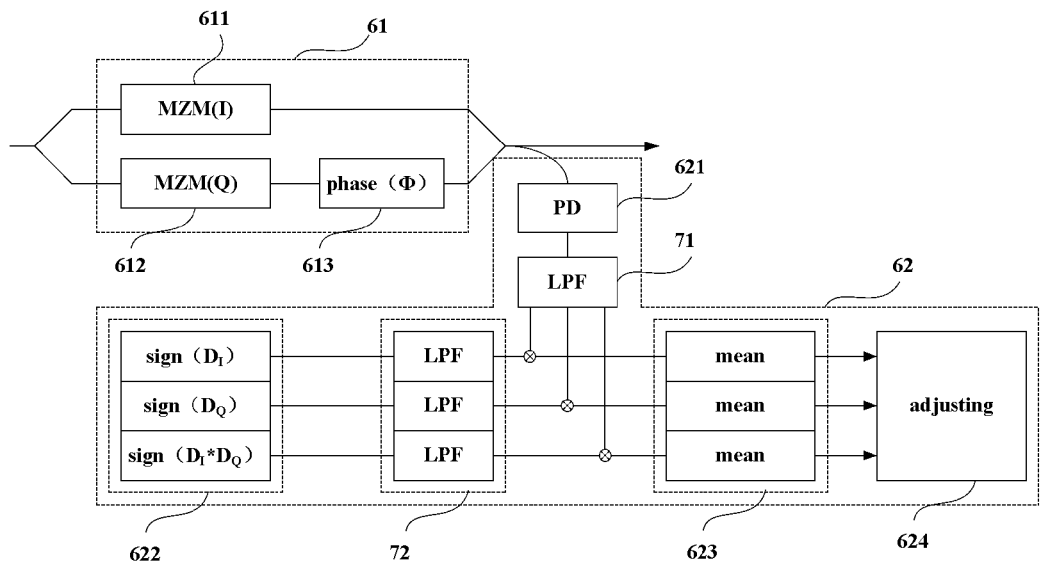
FIG. 9 is a schematic diagram of the structure of still another variant of the automatic bias control apparatus of the embodiment shown in FIG. 6.

FIG. 9 is a schematic diagram of the structure of still another variant of the automatic bias control apparatus of an embodiment of the present invention. The automatic bias control apparatus of this embodiment comprises both the low-pass filter (the first low-pass filter module) 71 configured to perform low-pass filtering to the output optical power and the low-pass filter (the second low-pass filter module) 72 configured to perform low-pass filtering to the signals sign $(D_I)$, $\text{sign}(D_Q)$ and $\text{sign}(D_I*D_Q)$. With the automatic bias control apparatus of this embodiment, the calculating module 623 calculates the bias voltage indicating values of the I modulator, Q modulator and phase modulator according to the low-pass filtered output optical power, the low-pass filtered sign corresponding to the I modulation data, the low-pass filtered sign corresponding to the Q modulation data and the low-pass filtered sign corresponding to the product of the I modulation data and the Q modulation data. That is, three indicating signals are obtained by multiplying the low-pass filtered signs corresponding to the three modulation data by the low-pass filtered output signals of the optoelectric detector and then being averaged, which are used respectively to adjust the bias voltages of the I, Q and Φ routes.

Figure 10:
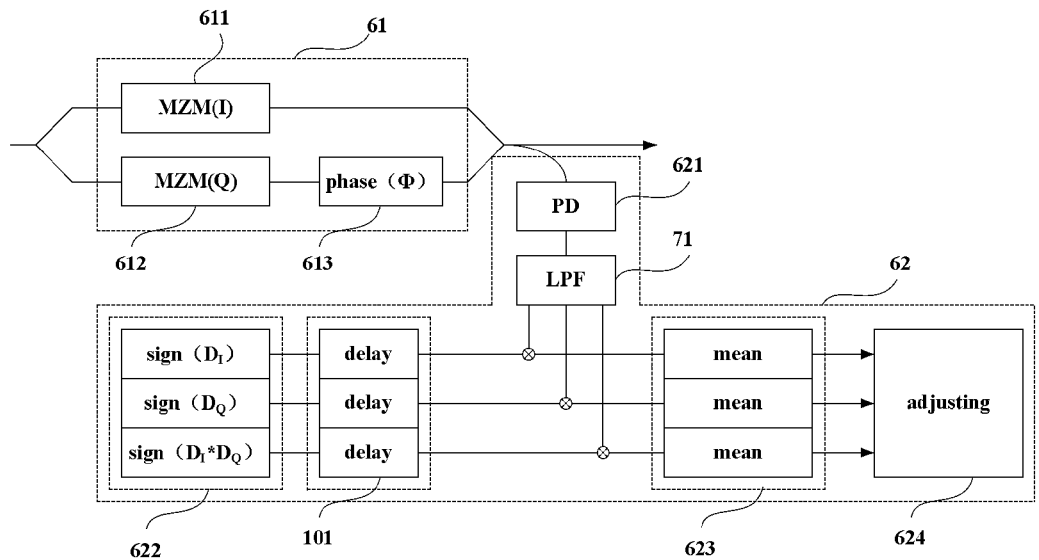
FIG. 10 is a schematic diagram of the structure of the embodiment shown in FIG. 7 with a tunable delay module being added.
Figure 11:
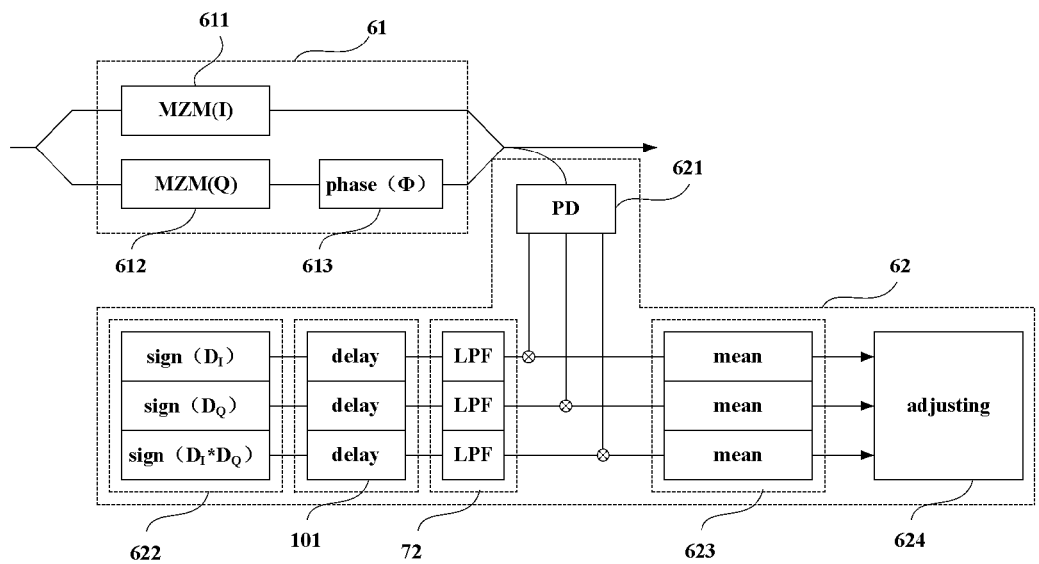
FIG. 11 is a schematic diagram of the structure of the embodiment shown in FIG. 8 with a tunable delay module being added.
Figure 12:
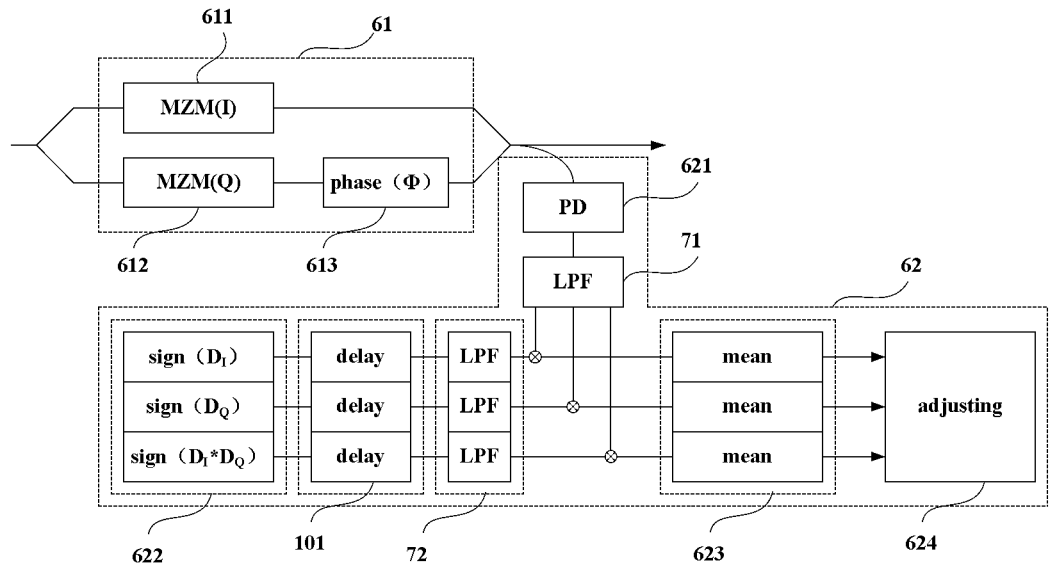
FIG. 12 is a schematic diagram of the structure of the embodiment shown in FIG. 9 with a tunable delay module being added.

In the automatic bias control apparatuses of the embodiments shown in FIGS. 7-9, in order to ensure the synchronization of light intensity signals and sign signals, three tunable delay modules may be added to adjust the time delay of the sign signals, thereby forming three embodiments shown in FIGS. 10-12.

The embodiment of FIG. 10 is based on the embodiment of FIG. 7 with a tunable delay module 101 being added, with other compositions and function being the same as those of the embodiment of FIG. 7, which shall not be described herein any further; the embodiment of FIG. 11 is based on the embodiment of FIG. 8 with a tunable delay module 101 being added, with other compositions and function being the same as those of the embodiment of FIG. 8, which shall not be described herein any further; and embodiment of FIG. 12 is based on the embodiment of FIG. 9 with a tunable delay module 101 being added, with other compositions and function being the same as those of the embodiment of FIG. 9, which shall not be described herein any further.

In the embodiments shown in FIGS. 10-12, the function of the tunable delay module 101 is to synchronize the measured optical power signals with the sign signals. In a practical system, there exists possibly a relative time delay between the measured optical power signals and the sign signals, which mainly comes from a time delay of a circuit (such as a PD, an LPE, and an ADC, etc.). An extra large time delay will cause an automatic bias control method to be invalid. The function of the tunable delay module added into the embodiments shown in FIGS. 10-12 is to compensate for the time delay brought by a circuit, control the remaining time delay within an acceptable range, and ensure the automatic bias control method to be valid.

It is shown in emulation that the tolerance to the remaining time delay is inversely proportional to the bandwidths of the PD and filer, that is, the smaller the bandwidths of the PD and filer, the larger the tolerance to the remaining time delay. However, as the decrease of the bandwidth, the signal-to-noise ratio of an obtained indicating signal will be decreased, which will affect the precision of control of the bias voltage. In different systems, in order to achieve specific precision of control of the bias voltage, there are different requirements on the bandwidth of the filer and the magnitude of the remaining time delay. If a tunable delay device is added, it will bring large flexibility to the automatic bias control apparatus. As the sign signal is a binary signal (±1), and its time delay may be realized by using a circuit of low complexity, tunable delay devices are added into the sign signal routes shown in FIGS. 9-11.

In this embodiment, the tunable delay module is configured to compensate for the time delay of the circuit. If the time delay of the circuit may be measured in a certain manner, the measured value of time delay may be set for the time delay device. Besides a method of direct measurement, following methods may be used in the embodiments of the present invention to set the time delay value of a time delay device.

Since if a tunable delay module is set reasonably, the optical power signals and the sign signals are synchronized, and the output of the calculating unit will indicate a difference between the current bias voltage and an ideal bias voltage; if a tunable delay module is set unsuitably, the optical power signals and the sign signals are not synchronized, and the absolute value outputted by the calculating unit will be decreased; and if there exists relatively large offset between the optical power signals and the sign signals in the time domain and they are completely not synchronized, the output of the calculating unit will tend to be zero. According to such a characteristic, the embodiments of the present invention may first bias the I/Q modulator at a nonoptimal state and keep the bias voltage constant. At this moment, the three tunable delay modules are adjusted respectively so that the absolute values of the vias voltage indicating signals outputted by respective calculating units are as large as possible under the current bias voltage. If it is found that the indicating signal outputted by a calculating unit is always very small in adjusting a tunable delay module, the magnitude of the corresponding bias voltage is varied and then the above process of adjustment is repeated, until the absolute value of the indicating signal outputted by the calculating unit is as large as possible under the current bias voltage. At this moment, it may be deemed that the tunable delay modules are adjusted well, and the optical power signals and the sign signals are synchronized.

In the above embodiments, the multiplication operation may be realized by a multiplier, and the averaging operation may be realized by an integrator; however, these embodiments are not limited thereto.

There may also be following variants based upon the automatic bias control apparatus shown in FIG. 6.

Figure 13:
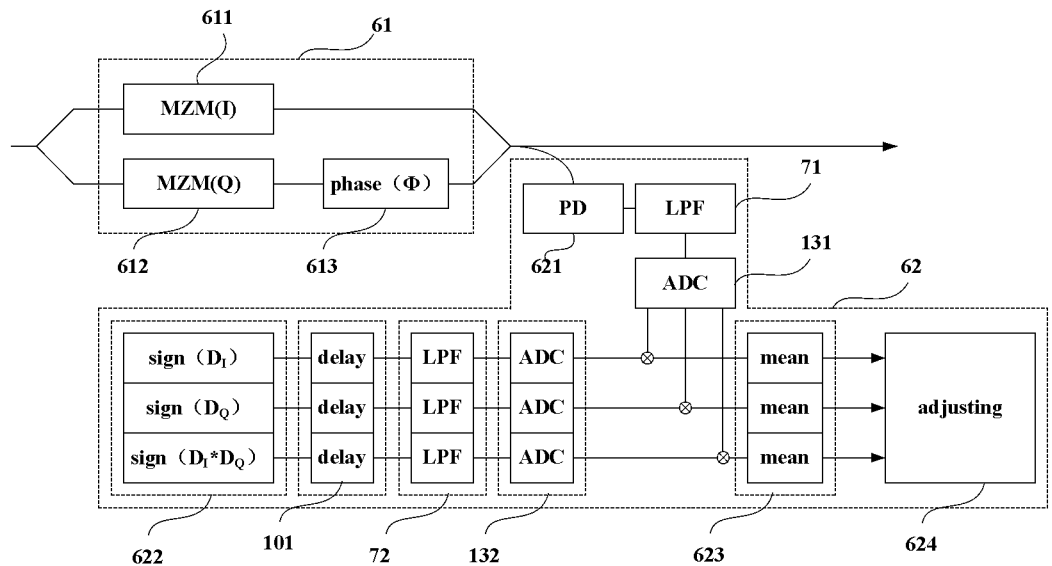
FIG. 13 is a schematic diagram of the structure of still another variant of the automatic bias control apparatus of the embodiment shown in FIG. 6.

FIG. 13 is a schematic diagram of the structure of a variant of the automatic bias control apparatus in a digital manner of an embodiment of the present invention. As shown in FIG. 13, the automatic bias control apparatus of this embodiment is based on any one of the embodiments shown in FIGS. 6-12, with two analog-to-digital converters (ADCs) being added, one ADC (a first analog-to-digital converting module) 131 is configured to perform analog-to-digital conversion to the output optical power and the other ADC (a second analog-to-digital converting module) 132 is configured to perform analog-to-digital conversion respectively to the sign corresponding to the I modulation data, the sign corresponding to the Q modulation data and the sign corresponding to the product of the I modulation data and the Q modulation data. In this embodiment, different from FIG. 12, following the LPE, an analog signal is converted into a digital signal by an ADC for processing. The sampling rate of the optical power signals is equal to that of the sign signals, so that they may be multiplied one sampling value by one sampling value. The above sampling rate may be lower than the baud rate for transmitting signals, so that the apparatus may be realized by hardware of a low speed (low cost). In this embodiment, the multiplication operation may be carried out by a digital multiplier, and the averaging operation may be carried out by a digital adder. As shown in FIG. 13, as this embodiment corresponds to any one of the embodiments shown in FIGS. 6-12, the LPE and the tunable delay module are alternative, and their functions are the same as those described above, which shall not be described herein any further.

Figure 14:
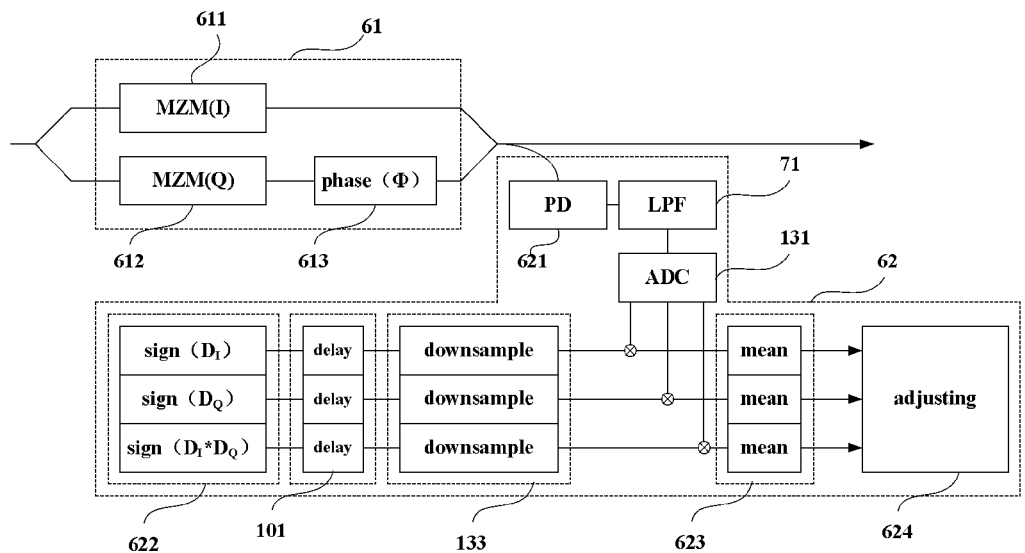
FIG. 14 is a schematic diagram of the structure of still another variant of the automatic bias control apparatus of the embodiment shown in FIG. 6.

FIG. 14 is a schematic diagram of the structure of a variant of the automatic bias control apparatus in a digital manner of another embodiment of the present invention. As shown in FIG. 14, the automatic bias control apparatus of this embodiment is based on the embodiment shown in FIG. 6, with an ADC (a first analog-to-digital converting module) 131 and a down sampling module 133 being added; wherein the ADC 131 is configured to perform analog-to-digital conversion to the output optical power, and the down sampling module 133 is configured to perform respectively down sampling to the sign corresponding to the I modulation data, the sign corresponding to the Q modulation data and the sign corresponding to the product of the I modulation data and the Q modulation data. The down sampling is to extract a sign signal every other several signs. In this embodiment, the sampling rate of the down sampled sign signal is identical to the sampling rate of the ADC, so that the down sampled sign signal may be multiplied by the optical power signal processed by the ADC one sampling value by one sampling value. The above sampling rate may be far less than the baud rate for transmitting signals, so that the apparatus may be realized by hardware circuit of a low speed (low cost). As only two values, ±1, are taken for a sign signal, the multiplication in this embodiment just changes signs, without substantive multiplication operation. In this embodiment, a low-pass filter (a first low-pass filter module) configured to perform low-pass filtering to the output optical signals may be added, and a tunable delay module configured to tune respectively time delay of the sign signals (the sign corresponding to the I modulation data, the sign corresponding to the Q modulation data and the sign corresponding to the product of the I modulation data and the Q modulation data) may also be added. However, the LPE and the tunable delay module are alternative, and their functions are the same as those described above, which shall not be described herein any further.

In the above embodiment, the averaging operation is to average in a period of time, the length of the period of time being not limited in the present invention.

With the automatic bias control apparatus of this embodiment, the automatic bias control of the I/Q modulator of the transmitter is realized by using a detecting unit (an optoelectronic detector) to monitor the current output optical power of the I/Q modulator, using a calculating unit to calculate the bias voltage indicating values according to formulae (8)-(10), and using an adjusting unit to adjust the three bias voltages according to known feedback methods (such as formulae (11)-(13)). The advantages of the apparatus exist in: compared with the methods using pilot signals, processes of generating and detecting pilot signals are omitted; compared with the methods feeding back control according to demodulated signals, the complex process of signal demodulation is omitted; and compared with other methods monitoring statistical amounts of signals, the adjustment of the three bias voltages in the I/Q modulator in the method of the embodiments of the present invention is in a right direction toward their optimal values, and no jitter is needed.

Embodiment 2

Figure 15:
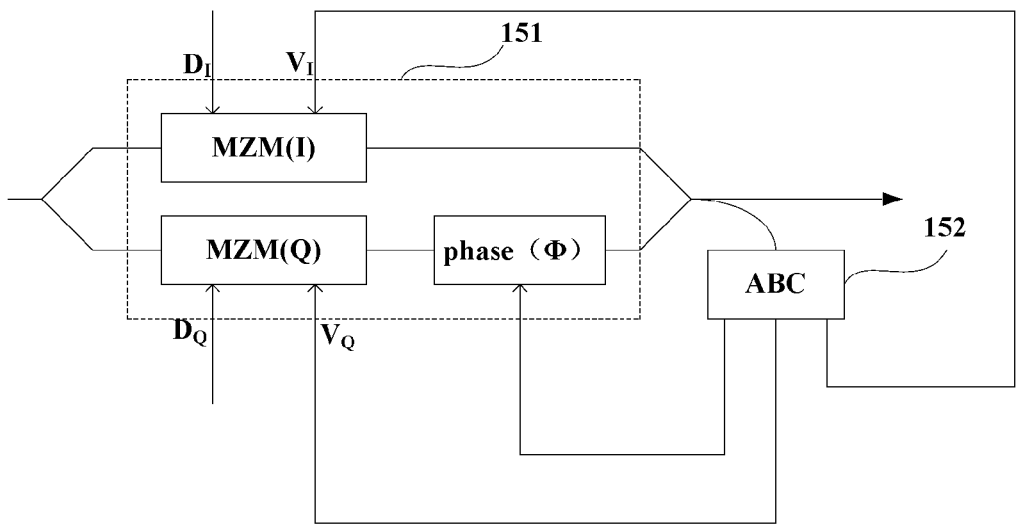
FIG. 15 is a schematic diagram of the composition of the transmitter of an embodiment of the present invention.

An embodiment of the present invention further provides an optical transmitter. FIG. 15 is a schematic diagram of the structure of the transmitter. As shown in FIG. 15, the optical transmitter comprises an I/Q modulator 151 and an automatic bias control apparatus 152; wherein the automatic bias control (ABC) apparatus 152 may be realized by the automatic bias control apparatus of Embodiment 1, the contents of which being incorporated herein, which shall not be described herein any further.

The optical transmitter of the embodiment of the present invention uses the automatic bias control apparatus of an embodiment of the present invention, and has the following advantages: compared with the methods using pilot signals for automatic bias control, processes of generating and detecting pilot signals are omitted; compared with the methods feeding back control for automatic bias control according to demodulated signals, the complex process of signal demodulation is omitted; and compared with other methods monitoring statistical amounts of signals, the adjustment of the three bias voltages in the I/Q modulator by the transmitter of the embodiments of the present invention is in a right direction toward their optimal values, and no jitter is needed.

An embodiment of the present invention further provides an automatic bias control method for optical transmitter, as stated below. As the principle for solving problems is identical to that of the automatic bias control apparatus of Embodiment 1, the implementation of Embodiment 1 may be referred to for the implementation of this method, and the repeated parts shall not be described herein any further.

Embodiment 3

Figure 16:
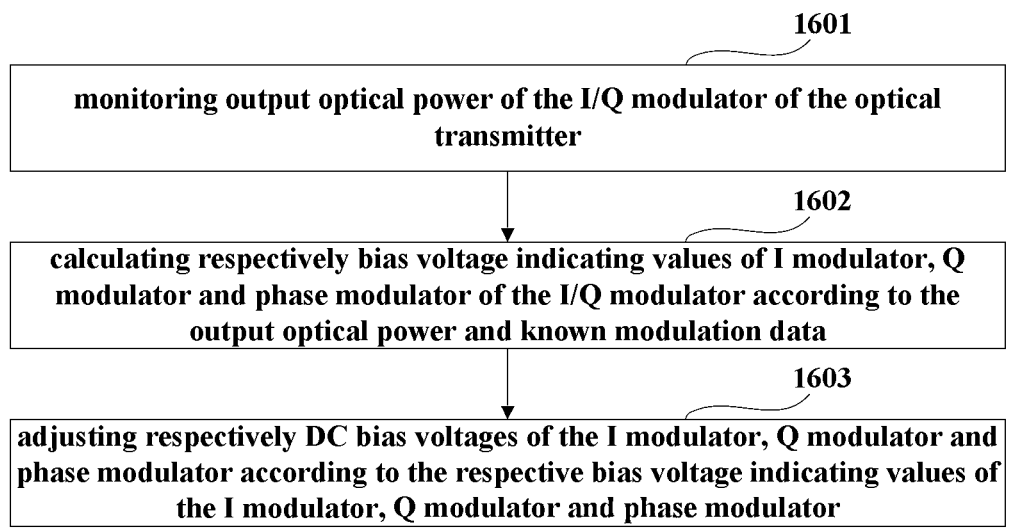
FIG. 16 is a flowchart of the automatic bias control method of an embodiment of the present invention.

An embodiment of the present invention further provides an automatic bias control method for optical transmitter. FIG. 16 is a flowchart of the method. Referring to FIG. 16, the method comprises:

step 1601: monitoring output optical power of the I/Q modulator of the optical transmitter;

step 1602: calculating respectively bias voltage indicating values of I modulator, Q modulator and phase modulator of the I/Q modulator according to the output optical power and known modulation data; and step 1603: adjusting respectively DC bias voltages of the I modulator, Q modulator and phase modulator according to the respective bias voltage indicating values of the I modulator, Q modulator and phase modulator.

In an embodiment of step 1602, following steps may further be included:

step 16021: extracting the sign corresponding to I modulation data of the I/Q modulator, the sign corresponding to Q modulation data, and the sign corresponding to product of the I modulation data and the Q modulation data; and step 16022: calculating respectively the bias voltage indicating values of the I modulator, Q modulator and phase modulator according to the output optical power, the sign corresponding to the I modulation data, the sign corresponding to the Q modulation data and the sign corresponding to the product of the I modulation data and the Q modulation data.

In an embodiment of step 16022, the bias voltage indicating values of the I modulator, Q modulator and phase modulator may be respectively calculated according to the following formulae:

$$\Delta_I = \text{mean}(P \cdot \text{sign}(D_I)),$$

$$\Delta_Q = \text{mean}(P \cdot \text{sign}(D_Q)),$$

$$\Delta_\Phi = -\text{mean}(P \cdot \text{sign}(D_I * D_Q)).$$

In an embodiment, in step 1603, the DC bias voltage of the I modulator, the DC bias voltage of the Q modulator and the DC bias voltage of the phase modulator may be respectively adjusted according to the following formulae:

$$V_I = V_I - \mu_I \Delta_I,$$

$$V_Q = V_Q - \mu_Q \Delta_Q,$$

$$V_\Phi = V_\Phi - \mu_\Phi \Delta_\Phi;$$

where, P is the output optical power, $D_I$ is the I modulation data of the I/Q modulator, $D_Q$ is the Q modulation data of the I/Q modulator, $D_I * D_Q$ is the product of the I modulation data and the Q modulation data, $\text{sign}(D_I)$ is the sign corresponding to the I modulation data, $\text{sign}(D_Q)$ is the sign corresponding to the Q modulation data, $\text{sign}(D_I * D_Q)$ is the sign corresponding to the product of the I modulation data and the Q modulation data, mean(•) denotes averaging operation, $\Delta_I$ is the bias voltage indicating value of the I modulator, $\Delta_Q$ is the bias voltage indicating value of the Q modulator, $\Delta_\Phi$ is the bias voltage indicating value of the phase modulator, and $\mu_I$, $\mu_Q$, $\mu_\Phi$ are respective step sizes for adjusting $V_I$, $V_Q$, $V_\Phi$, which are positive real numbers.

In an embodiment of step 16022, the bias voltage indicating values of the I modulator, Q modulator and phase modulator may be calculated according to low-pass filtered output optical power, the sign corresponding to the I modulation data, the sign corresponding to the Q modulation data and the sign corresponding to the product of the I modulation data and the Q modulation data.

In another embodiment of step 16022, the bias voltage indicating values of the I modulator, Q modulator and phase modulator may be calculated according to the output optical power, the low-pass filtered sign corresponding to the I modulation data, the low-pass filtered sign corresponding to the Q modulation data and the low-pass filtered sign corresponding to the product of the I modulation data and the Q modulation data.

In still another embodiment of step 16022, the bias voltage indicating values of the I modulator, Q modulator and phase modulator may be calculated according to low-pass filtered output optical power, the low-pass filtered sign corresponding to the I modulation data, the low-pass filtered sign corresponding to the Q modulation data and the low-pass filtered sign corresponding to the product of the I modulation data and the Q modulation data.

In an embodiment of step 16022, analog-to-digital conversion may first be performed to the output optical power, the sign corresponding to the I modulation data, the sign corresponding to the Q modulation data and the sign corresponding to the product of the I modulation data and the Q modulation data, and then the bias voltage indicating values of the I modulator, Q modulator and phase modulator may be calculated. Alternatively, low-pass filtering and then analog-to-digital conversion may be performed to the output optical power. Alternatively, time delay and/or low-pass filtering and then analog-to-digital conversion may be performed to the sign signals.

In an embodiment of step 16022, analog-to-digital conversion may be performed to the output optical power and down sampling may be respectively performed to the sign corresponding to the I modulation data, the sign corresponding to the Q modulation data and the sign corresponding to the product of the I modulation data and the Q modulation data, and then the bias voltage indicating values of the I modulator, Q modulator and phase modulator may be calculated. Alternatively, low-pass filtering and then analog-to-digital conversion may be performed to the output optical power. Alternatively, time delay and then down sampling may be performed to the sign signals.

With the method of the embodiment of the present invention for automatic bias control of a transmitter, the automatic bias control of the I/Q modulator of the transmitter is realized by monitoring the current output optical power of the I/Q modulator, calculating the bias voltage indicating values according to formulae (8)-(10) and finally adjusting the three bias voltages according to known feedback methods (such as formulae (11)-(13)). The method has the following advantages: compared with the methods using pilot signals for automatic bias control, processes of generating and detecting pilot signals are omitted; compared with the methods feeding back control for automatic bias control according to demodulated signals, the complex process of signal demodulation is omitted; and compared with other methods monitoring statistical amounts of signals, the adjustment of the three bias voltages in the method of the embodiment of the present invention is in a right direction toward their optimal values, and no jitter is needed.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. An automatic bias control apparatus for optical transmitter, comprising:
   a detecting unit configured to monitor output optical power of an I/Q modulator of the optical transmitter;
   a calculating unit configured to calculate respective bias voltage indicating values of the I modulator, Q modulator and phase modulator of the I/Q modulator according to the output optical power and known modulation data; and
   an adjusting unit configured to adjust respectively Direct-Current (DC) bias voltages of the I modulator, Q modulator and phase modulator according to the respective bias voltage indicating values of the I modulator, Q modulator and phase modulator;
   wherein the calculating unit comprises:
   a sign extracting module configured to extract the sign of I modulation data of the I/Q modulator, the sign of Q modulation data of the I/Q modulator, and the sign of a product of the I modulation data and the Q modulation data; and a calculating module configured to calculate respectively the bias voltage indicating values of the I modulator, Q modulator and phase modulator according to the output optical power, the sign of the I modulation data, the sign of the Q modulation data and the sign of the product of the I modulation data and the Q modulation data.

2. The apparatus according to claim 1, wherein the calculating module calculates respectively the bias voltage indicating values of the I modulator, Q modulator and phase modulator according to the formulae below:

$$\Delta_I = \text{mean}(P \cdot \text{sign}(D_I));$$

$$\Delta_Q = \text{mean}(P \cdot \text{sign}(D_Q));$$

$$\Delta_\Phi = -\text{mean}(P \cdot \text{sign}(D_I * D_Q));$$

and the adjusting unit adjusts respectively the DC bias voltage of the I modulator, the DC bias voltage of the Q modulator and the DC bias voltage of the phase modulator according to the formulae below:

$$V_I = V_I - \mu_I \Delta_I;$$

$$V_Q = V_Q - \mu_Q \Delta_Q;$$

$$V_\Phi = V_\Phi - \mu_\Phi \Delta_\Phi;$$

where, P is the output optical power, $D_I$ is the I modulation data of the I/Q modulator, $D_Q$ is the Q modulation data of the I/Q modulator, $D_I * D_Q$ is the product of the I modulation data and the Q modulation data, sign(•) denotes sign extracting operation, sign($D_I$) is the sign of the I modulation data, sign($D_Q$) is the sign of the Q modulation data, sign($D_I * D_Q$) is the sign of the product of the I modulation data and the Q modulation data, mean(•) denotes averaging operation, $\Delta_I$ is the bias voltage indicating value of the I modulator, $\Delta_Q$ is the bias voltage indicating value of the Q modulator, $\Delta_\Phi$ is the bias voltage indicating value of the phase modulator, and $\mu_I$, $\mu_Q$, $\mu_\Phi$ are respective step sizes for adjusting $V_I$, $V_Q$, $V_\Phi$, which are positive real numbers.

3. The apparatus according to claim 1, wherein the calculating unit further comprises:
a first low-pass filter module configured to perform low-pass filtering to the output optical power; and/or
a second low-pass filter module configured to perform low-pass filtering to the sign of the I modulation data, the sign of the Q modulation data and the sign of the product of the I modulation data and the Q modulation data; and/or
a first analog-to-digital converting module configured to perform analog-to-digital conversion to the output optical power; and
a second analog-to-digital converting module configured to perform analog-to-digital conversion to the sign of the I modulation data, the sign of the Q modulation data and the sign of the product of the I modulation data and the Q modulation data;
and/or
a tunable delay module configured to tune respectively time delay of the sign of the I modulation data, the sign of the Q modulation data and the sign of the product of the I modulation data and the Q modulation data.

4. The apparatus according to claim 3, wherein
when the calculating unit comprises the first low-pass filter module, the calculating module calculates the bias voltage indicating values of the I modulator, Q modulator and phase modulator according to the low-pass filtered output optical power, the sign of the I modulation data, the sign of the Q modulation data and the sign of the product of the I modulation data and the Q modulation data;
when the calculating unit comprises the second low-pass filter module, the calculating module calculates the bias voltage indicating values of the I modulator, Q modulator and phase modulator according to the output optical power, the low-pass filtered sign of the I modulation data, the low-pass filtered sign of the Q modulation data and the low-pass filtered sign of the product of the I modulation data and the Q modulation data; and
when the calculating unit comprises the first low-pass filter module and the second low-pass filter module, the calculating module calculates the bias voltage indicating values of the I modulator, Q modulator and phase modulator according to the low-pass filtered output optical power, the low-pass filtered sign of the I modulation data, the low-pass filtered sign of the Q modulation data and the low-pass filtered sign of the product of the I modulation data and the Q modulation data.

5. The apparatus according to claim 1, wherein the calculating unit further comprises:
a first analog-to-digital converting module configured to perform analog-to-digital conversion to the output optical power; and
a down sampling module configured to perform respectively down sampling to the sign of the I modulation data, the sign of the Q modulation data and the sign of the product of the I modulation data and the Q modulation data.

6. The apparatus according to claim 5, wherein the calculating unit further comprises:
a first low-pass filter module configured to perform low-pass filtering to the output optical power; and/or
a tunable delay module configured to tune respectively time delay of the sign of the I modulation data, the sign of the Q modulation data and the sign of the product of the I modulation data and the Q modulation data.

7. An optical transmitter, comprising an I/Q modulator and an automatic bias control apparatus as claimed in claim 1.

8. An automatic bias control method for optical transmitter, comprising:
monitoring output optical power of the I/Q modulator of the optical transmitter;
calculating respectively bias voltage indicating values of I modulator, Q modulator and phase modulator of the I/Q modulator according to the output optical power and known modulation data; and
adjusting respectively DC bias voltages of the I modulator, Q modulator and phase modulator according to the respective bias voltage indicating values of the I modulator, Q modulator and phase modulator;
wherein the step of calculating bias voltage indicating values comprises:
extracting the sign of I modulation data of the I/Q modulator, the sign of Q modulation data of the I/Q modulator, and the sign of product of the I modulation data and the Q modulation data; and
calculating respectively the bias voltage indicating values of the I modulator, Q modulator and phase modulator according to the output optical power, the sign of the I modulation data, the sign of the Q modulation data and the sign of the product of the I modulation data and the Q modulation data.

* * * * *

UNITED STATES PATENT AND TRADEMARK OFFICE
CERTIFICATE OF CORRECTION

| | |
|---|---|
| PATENT NO. | : 8,977,119 B2 |
| APPLICATION NO. | : 13/934722 |
| DATED | : March 10, 2015 |
| INVENTOR(S) | : Meng Yan et al. |

It is certified that error appears in the above-identified patent and that said Letters Patent is hereby corrected as shown below:

On the Title Page

Column 1, Item [73] (Assignee), Line 1, Delete "Fuijtsu Limited," and insert -- Fujitsu Limited, --, therefor.

In the Specification

Column 1, Line 9, Delete "2013," and insert -- 2012, --, therefor.

Signed and Sealed this
Eighteenth Day of August, 2015

Michelle K. Lee
*Director of the United States Patent and Trademark Office*